United States Patent [19]

Okano et al.

[11] 4,134,446

[45] Jan. 16, 1979

[54] SEALING MECHANISM FOR ROTATIVE HEAT REGENERATOR

[75] Inventors: Hiroshi Okano, Susono; Masayuki Iwatsuki, Takahama, both of Japan

[73] Assignees: Toyota Jidosha Kogyo Kabushiki Kaisha, Toyota; Nippondenso Co., Ltd., Showa, both of Japan

[21] Appl. No.: 824,602

[22] Filed: Aug. 15, 1977

[30] Foreign Application Priority Data

Mar. 10, 1977 [JP] Japan .................................. 52-26702

[51] Int. Cl.$^2$ ............................................. F28D 19/00
[52] U.S. Cl. .................................... 165/9; 277/81 R; 277/92
[58] Field of Search ..................... 277/12, 81 R, 82, 88, 277/92; 165/9

[56] References Cited

U.S. PATENT DOCUMENTS

| | | | |
|---|---|---|---|
| 2,852,233 | 9/1958 | Hryniszak | 165/9 |
| 3,301,317 | 1/1967 | Weaving et al. | 165/9 X |
| 3,893,505 | 7/1975 | Fujikake et al. | 165/9 |

*Primary Examiner*—Albert W. Davis, Jr.

*Attorney, Agent, or Firm*—Stevens, Davis, Miller & Mosher

[57] ABSTRACT

The sealing mechanism for a rotative heat regenerator herein disclosed includes a pair of seal rings fixed to an axle received in the central hole of a disc-shaped rotative heat regenerator core. Each seal ring has a boss provided in the center and inserted over the axle, at least two arms extending outwardly from the boss and rings being attached to the outer ends of the arms and identical in diameter to the heat regenerator. The boss, the arms and the rings are positioned opposite to the center, the side face and the outer periphery, respectively, of the heat regenerator. Each of the boss, the arms and the rings has a sliding member facing either side of the heat regenerator, and the sliding members provided in the rings are slidable along the outer surface of the regenerator. Elastic bodies are interposed between the sliding members and the regenerator surface. Thus, if the side face of the heat regenerator and/or the ring is distorted, excellent sealing can be maintained around the outer surface of the heat regenerator to prevent gas leakage therefrom without requiring an increased driving torque for the regenerator.

10 Claims, 4 Drawing Figures

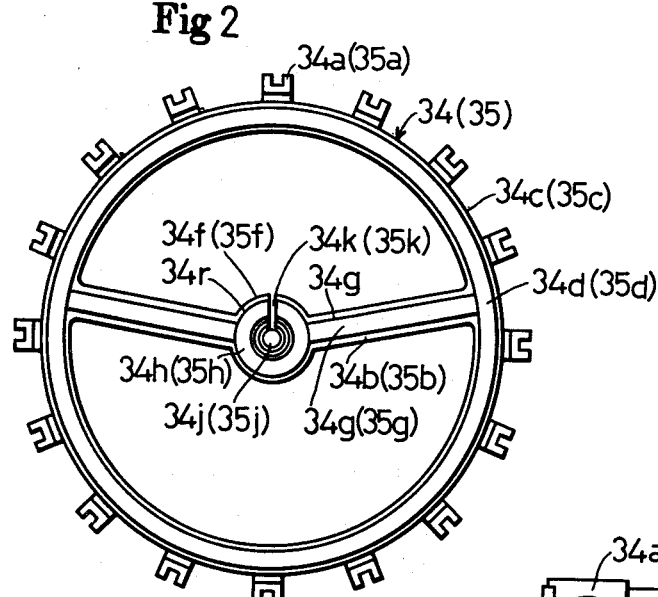
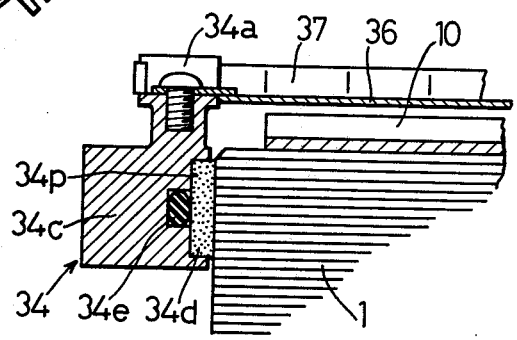
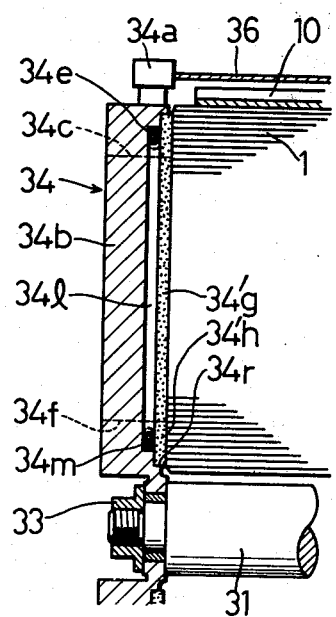

SEALING MECHANISM FOR ROTATIVE HEAT REGENERATOR

The present invention relates to an improvement in a sealing mechanism for a rotative heat regenerator.

In general, a rotative heat regenerator has sliding plates positioned between a rotating regenerator core and a stationary duct by bellows capable of elastic deformation. The sliding plates are pressed against the regenerator core by pressure differences in working fluid and spring load on the bellows so that effective sealing is obtained to prevent leakage of fluid.

It is, however, necessary to press the sliding plates against the regenerator core under an overload to provide a satisfactory seal even in case of its thermal deformation. Thus, the regenerator core and/or the sliding plates are easily worn and the heat regenerator is not durable enough. Further, the sliding plates on the higher temperature side tend to be distorted by thermal deformation to develop a clearance between the plates and the regenerator, through which working fluid leaks to lower the engine output. Still further, the bellows on the higher temperature side yield easily even if a high-grade material is used, and it is difficult to maintain uniform load for pressing the sliding plates against the regenerator core.

An object of the present invention is to provide a sealing mechanism for a rotative heat regenerator having a sufficient sealing effect around the outer periphery of the regenerator core with an appropriate surface pressure without increasing the driving torque for the regenerator core.

Another object of the present invention is to provide a sealing mechanism for a rotative heat regenerator capable of perfectly sealing the outer periphery of the regenerator core when flatness in the side surface of the regenerator is lost.

Still another object of the present invention is to provide a sealing mechanism for a rotative heat regenerator capable of effectively sealing the regenerator core without increasing the driving torque thereof over a wide range of surface pressures against the side surface of the regenerator core.

Yet another object of the present invention is to provide a sealing mechanism for a rotative heat regenerator which can keep the driving torque for the regenerator core low and prolong durability of the heat regenerator.

A further object of the present invention is to provide a sealing mechanism for a rotative heat regenerator which is effectively applicable to any rotative heat regenerator widely utilized in the automotive industry.

The invention will now be described in further detail by way of example with reference to the accompanying drawings, in which:

FIG. 2 is a fragmentary reduced side elevational view of FIG. 1;

FIG. 3 is a fragmentary enlarged view of FIG. 1; and

FIG. 4 is a fragmentary enlarged longitudinal sectional view showing another embodiment of the present invention.

Figure 1:
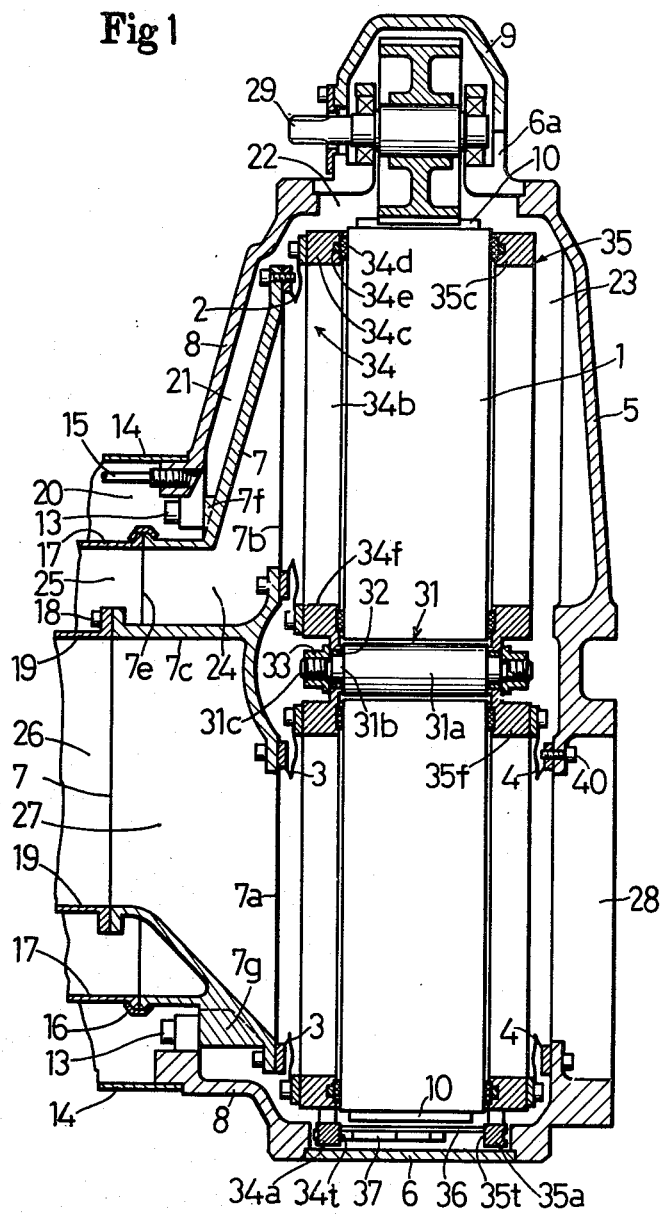
FIG. 1 is a longitudinal sectional view of a rotative heat regenerator in which the sealing mechanism of the present invention is applied.

Referring now to FIG. 1 of the drawings, there is shown an outer cylindrical shell 14 forming an engine housing coaxially encircling a turbine exit housing 19 and an inner cylindrical housing 17 coaxially interposed therebetween. The outer cylindrical shell 14 is fixed to a cover 8 of a regenerator core 1 by a plurality of bolts 15 in an airtight manner. The inner surface of the cover 8 is provided with a pair of arms 8a and 8b to which bosses 7f and 7g, respectively, of a cover 7 of the inner cylindrical housing 17 are fixed by bolts 13, defining between the covers 7 and 8 spaces 20 and 21 which communicate with each other. The inner cylindrical housing 17 connected to a combustor (not shown) is fixed to the cover 7 by a band 16. The turbine exit housing 19 is also fixed to the cover 7 by a bolt 18.

At its right-hand end as viewed in FIG. 1, the inner cover 7 has two openings 7a and 7b which form a circle together and have a partition wall 7c therebetween. At its left-hand end in FIG. 1, the inner cover 7 has two circular openings 7d and 7e which are coaxial with each other and communicate with the openings 7a and 7b respectively, with its hollow spaces 27 and 24 separated from each other by the partition wall 7c. A cylindrical cover 6 is fitted between the covers 5 and 8 and fixed thereto by through bolts and nuts (not shown). The cover 6 has a plurality of openings 6a in its periphery for receiving driving and supporting means, such as a driving shaft 29 and a driving gear 9 provided for rotating the regenerator core 1 at a low speed. The regenerator core 1 is supplied in the form of a disc having numerous through holes in the axial direction thereof and a toothed ring 10 mounted on the outer surface thereof. The regenerator core 1 is centered by the driving gears 9 rotatably supported by the cover.

In a central through hole 1a of the regenerator core 1, there is inserted a spacer shaft 31 which has a large diameter portion 31a loosely fitted in the central hole 1a and two reduced diameter end portions 31b extending outwardly from the central hole 1a and provided with external threads 31c.

Seal rings 34 and 35 are fitted to the end portions 31b extending through central holes 34j, 35j by their bosses 34f and 35f, spacers 32 and nuts 33 which are engaged with the external threads 31c. The seal ring 34 is integrally molded with the boss 34f, at least two cross bar portions 34b radially projecting from the boss 34f and a ring portion 34c being coaxial with the boss 34f and fixed to the outer ends of the cross bar portions 34b. A clearance is formed between the side surface of the regenerator core 1 and an adjacent surface of the seal ring 34. In the inner surface of the ring portion 34c facing the regenerator core 1, there is formed a groove 34p which is T-shaped in cross section and contains an annular elastic body 34e and an annular sliding member 34d encircling the elastic body 34e and being slidable along the regenerator core 1 (see FIG. 3). In the inner surface of the cross bar portion 34b facing the regenerator core 1, there is formed a longitudinal groove 34q and, in the inner surface of the boss 34f, there is formed a round groove 34r, each groove being rectangular in cross section and containing sliding members 34g and 34h respectively, slightly spaced apart from the side surface of the regenerator core 1. The sliding members 34d, 34g and 34h are made of appropriate material in due consideration of sliding speed, pressure applied thereto and ambient temperature.

A plurality of arms 34a, 35a project radially from the outer surfaces of ring portions 34c and 35c. The ring portion 34c, cross bar portion 34b, partition wall 7c and the cover 5 have bottomed screw holes provided at appropriate pitches to receive screws 40 to fix bellows 2, 3 and 4. A cylindrical spacer ring 36 is interposed between the arms 34a and 35a, and maintained therebetween by a curved leaf spring 37 fixed at one end to the arm 34a. The length of the spacer ring 36 is such that the above mentioned clearance is formed between each of the seal rings 34, 35 and the regenerator core 1 when the spacer ring 36 is maintained between the arms 34a and 35a. The spacer ring 36 has an opening (not shown) in the portion corresponding to the opening 6a of the cover 6, wherethrough the driving gear 10 is engaged with the toothed ring 10.

The inner surfaces of the cross bar portion 34b, 35b and the sliding members 34g, 34h, 35g and 34h facing the regenerator core 1 are flush with each of surfaces 34t and 35t of the arms 34a and 35a which engage with the spacer ring 36.

In the boss 34f of the seal ring 34, there is formed a bottomed slit 34k which is substantially perpendicular to the cross bar portion 34b, so as to provide flexibility to the cross bar portion 34b. The large diameter portion 31a of the spacer shaft 31 is smaller in diameter than the central through hole 1a of the regenerator core 1 so that the regenerator core 1 can be easily centered by driving gears 9. The length of the large diameter portion 31a is identical to that of the spacer ring 36, i.e., slightly greater than the axial length of the regenerator core 1, so that the clearance is formed between the cross bar portion 34b and the regenerator core 1. Further, the spacer 32 is somewhat longer than the central hole 34j of the boss 34f so that the nut 33 will not prevent the regenerator core 1 from rotating and moving in the direction along the central hole 34j of the cross bar portion 34b.

In operation, air compressed by an engine compressor (not shown) flows through spaces 20, 21, 22 and 23 into the regenerator core 1 to be heated therein, and is thereafter transferred through spaces 24 and 25 into an engine combustor (not shown). Combustion gas which leaves the combustor at high temperature and pressure is reduced in pressure through a turbine (not shown), flows into the spaces 26 and 27, radiates heat through the regenerator core 1 and is discharged from the exhaust port 27 through an exhaust pipe (not shown).

The feature of the present invention is in the sealing function that works on the regenerator core 1 when fluid such as pressurized air or combustion gas passes therethrough. The elastic body 34yields several hundred microns to press the sliding member 34d against the ring portion 34c so that sufficient sealing effect is maintained during rotation of the regenerator core 1. Further, the sliding member 34d is not affected by plastic or elastic distortion of the ring portion 34c caused by un-uniform temperature distribution therein, and can maintain uniform sealing effect along its entire periphery, even if flatness of the regenerator core 1 is lost. The material of the elastic body 34e can be appropriately selected so that it may not impart so large a surface pressure to the sliding member 34d as will require an excessive torque for driving the regenerator core 1. When the sliding member 34d gets worn to a certain extent, surface pressure applied thereon is lowered because of less deformation of the elastic body 34e, and thus the sliding member 34d will not further be worn and durability thereof will be increased. During operation of the heat regenerator of the present invention, pressurized air flows behind the sliding member 34d and presses it to increase the surface pressure applied thereon. The surface pressure thus increased can, by appropriate location of the elastic body 34e, be lowered to around zero to a value applied to a conventional bellows-type seal.

Since there is a clearance between the sliding member 34g, 34h and the regenerator, the sliding members 34g, 34h generally have no effect on driving torque for the regenerator core 1, but they unavoidably get worn since the cross bar portion 34b is distorted against the regenerator core 1 and partially contacts it because of pressure differences or losses in the fluid flow. However, when the sliding members 34g, 34h get worn, localized application of the surface pressure thereon is reduced since the area of contact between the arm 34b and the regenerator core 1 is increased, so that the sliding members 34g, 34h are preferably made of a material which is easily worn.

Since the seal ring 34 is exposed to combustion gas before heat regeneration and to high temperature air after heat regeneration, the cross bar portion 34b and the boss 34f are heated to an especially high temperature. Therefore, sealing effect can also be maintained on the cross bar portion 34b and the boss 34f by cooling them or making them of heat-resisting material.

The seal ring 35 is constructed and disposed symmetrically to the seal ring 34 with respect to the core 1; therefore, no detailed description of this other seal ring would be necessary to anyone of ordinary skill in the art.

In FIG. 4 showing another embodiment of the present invention, the cross bar portion 34b is formed in its inner surface with a longitudinal groove which is identical in shape to the groove of the ring portion 34c and in which an elastic body 34l having a circular cross section and a sliding member 34g' having a rectangular cross section are received. The sliding member 34g' is slidable along the side surface of the regenerator core 1 in sealing contact therewith. There is also formed a groove 34r' having a T-shaped cross section in the inner surface of the boss 34f, in which a sliding member 34h' having a rectangular cross section are received. The sliding member 34h' is slidable along the side surfce of the regenerator core 1 in sealing contact therewith.

While the invention has been described with reference to a preferred embodiment thereof, it is to be understood that modifications or variations may be easily made without departing from the scope of this invention which is defined by the appended claims.

What is claimed is:

1. A sealing mechanism for a discoidal rotative heat regenerator core rotatively supported by a driving gear and having a toothed ring adapted to engage with said driving gear around the outer surface thereof, said sealing mechanism comprising a pair of seal rings between which said regenerator core is interposed, each of said seal rings including a central boss engaged with a spacer shaft mounted in a central through hole of said regenerator core and a ring portion facing the outer periphery of said regenerator core and connected to said boss by at least two cross bar portions, said boss, ring portion and cross bar portions having sliding members facing either side of said regenerator core, at least one of said sliding members on said ring portion being slidable on either side of said regenerator core, an elastic body being interposed between said at least one sliding member and said regenerator core.

2. The invention as defined in claim 1 wherein said ring portion has a groove in its surface facing said regenerator core for receiving said elastic body and a part of said sliding member.

3. The invention as defined in claim 2 wherein said groove is separated into two parts respectively receiving said elastic body and said sliding member, and is T-shaped in cross section.

4. The invention as defined in claim 3 wherein said elastic body is circular in cross section and said sliding member is rectangular in cross section.

5. The invention as defined in claim 1 wherein said boss has a ring-shaped groove around the center thereof and each of said cross bar portions has a longitudinal groove, each of said grooves facing said regenerator core and receiving a sliding member defining a clearance space between the regenerator core and said sliding member.

6. The invention as defined in claim 5 wherein said grooves and said sliding members are rectangular in cross section.

7. The invention as defined in claim 1 wherein said boss has a ring-shaped groove around the center thereof and each of said cross bar portions has a longitudinal groove, each of said grooves receiving an elastic body and a sliding member slidable in contact with said regenerator core.

8. The invention as defined in claim 7, wherein each of said grooves is separated into two parts respectively receiving said elastic body and said sliding member, and is T-shaped in cross section.

9. The invention as defined in claim 8, wherein said elastic member is circular in cross section and said sliding member is rectangular in cross section.

10. The invention as defined in claim 1 wherein said boss has a slit which is substantially perpendicular to said cross bar portion.

* * * * *